(12) United States Patent
Saito et al.

(10) Patent No.: US 7,769,833 B2
(45) Date of Patent: Aug. 3, 2010

(54) NETWORK SYSTEM

(75) Inventors: Hiroshi Saito, Kawasaki (JP); Yukio Ogawa, Tokyo (JP); Yuji Kimura, Kawasaki (JP); Kunihito Uchida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 11/691,585

(22) Filed: Mar. 27, 2007

(65) Prior Publication Data

US 2008/0126526 A1 May 29, 2008

(30) Foreign Application Priority Data

Nov. 24, 2006 (JP) .............................. 2006-316463

(51) Int. Cl.
*G06F 15/177* (2006.01)
(52) U.S. Cl. ....................... 709/220; 709/223
(58) Field of Classification Search ................. 709/220, 709/223; 705/14
See application file for complete search history.

(56) References Cited

U.S. PATENT DOCUMENTS

| | | | |
|---|---|---|---|
| 2002/0059360 A1* | 5/2002 | Ito et al. ..................... 709/203 |
| 2002/0174010 A1* | 11/2002 | Rice, III ....................... 705/14 |
| 2003/0061323 A1* | 3/2003 | East et al. .................... 709/223 |
| 2005/0160150 A1* | 7/2005 | Kao ............................ 709/212 |
| 2007/0067382 A1* | 3/2007 | Sun ............................ 709/203 |
| 2007/0115282 A1* | 5/2007 | Turner et al. ................. 345/424 |
| 2007/0266027 A1* | 11/2007 | Gattegno et al. ............... 707/8 |
| 2008/0082639 A1* | 4/2008 | Hochmuth et al. .......... 709/220 |

FOREIGN PATENT DOCUMENTS

JP         2006-209610        8/2006

* cited by examiner

*Primary Examiner*—Jungwon Chang
(74) *Attorney, Agent, or Firm*—Antonelli, Terry, Stout & Kraus, LLP.

(57) ABSTRACT

A network system including a management device with both a status managing unit for collecting status information on a terminal status and a terminal instructing unit for transmitting a shift start message to the terminal to make transfer data to the server on the basis of the status information collected by the status managing unit. The terminal includes a determining unit for determining data transfer in response to the shift start message, a data transferring unit for transferring the data to the server when the determining unit determines the data transfer, a storage device control unit for erasing the data from a storage device after completion of data transfer, and a thin client shifting unit for causing the terminal to function as a thin client after erasure of data.

8 Claims, 6 Drawing Sheets

FIG. 5

| 50 | 51 | 52 | 53 | 54 | 55 | 56 | 57 | 58 | 59 |
|---|---|---|---|---|---|---|---|---|---|
| IDEN-TIFIER | INSTALLATION LOCATION | OWN TERMINAL LOGIC ID INFORMATION | UPDATED DATE | PROGRAM STATUS | SHIFT STATUS | SHIFT DESTINATION LOGIC ID INFORMATION | SHIFT TIME (SECONDS) | ENABLED/ DISABLED SHIFT-BACK | SHIFT START TIME |
| PC00000 | AREA 1 | 133.144.1.99 | 2006/08/01 09:35:53 | EXECUTION COMPLETED | SHIFT COMPLETED | 133.144.5.99 | 0 | DISABLE | 2006/08/01 |
| PC00001 | AREA 1 | 133.144.1.100 | 2006/08/01 10:11:12 | EXECUTION COMPLETED | SHIFT COMPLETED | 133.144.5.100 | 0 | ENABLE (1 MONTH LEFT) | 10:00:00 |
| PC00002 | AREA 1 | 133.144.1.101 | 2006/08/01 10:15:44 | BEING EXECUTED | BEING SHIFTED (DEVICE BEING INVALIDATED) | 133.144.5.101 | 130 | ENABLE | INSTANT |
| PC00003 | AREA 1 | 133.144.1.102 | 2006/08/01 11:34:21 | BEING EXECUTED | BEING SHIFTED (DATA BEING ERASED) | 133.144.5.102 | 300 | ENABLE | INSTANT |
| PC00004 | AREA 1 | 133.144.1.103 | 2006/08/01 12:10:16 | BEING EXECUTED | BEING SHIFTED (DATA BEING COPIED) | 133.144.5.103 | 600 | ENABLE | INSTANT |
| PC00005 | AREA 1 | 133.144.1.104 | 2006/08/01 12:45:52 | BEING EXECUTED | STOPPED (BEING SHIFTED BACK) | 133.144.5.104 | 300 | ENABLE | INSTANT |
| PC00006 | AREA 1 | 133.144.1.105 | 2006/08/01 13:10:15 | BEING EXECUTED | STOPPED (FAILURE) | 133.144.5.105 | 600 | ENABLE | INSTANT |
| PC00006 | AREA 1 | 133.144.1.106 | 2006/08/01 13:21:35 | BEING EXECUTED | BEING SHIFTED | 133.144.5.106 | 1200 | — | INSTANT |
| PC00006 | AREA 1 | 133.144.1.107 | 2006/08/01 13:30:41 | BEING STOPPED | BEING SHIFTED (SHIFT TIME BEING CALCULATED) | 133.144.5.107 | MEASURING | — | INSTANT |
| PC00007 | AREA 1 | 133.144.1.108 | 2006/08/01 13:50:12 | BEING INSTALLED | BEFORE SHIFTED | — | — | — | 10 DAYS LATER |
| PC00008 | AREA 1 | 133.144.1.109 | 2006/08/01 14:10:34 | BEFORE INSTALLED | — | — | — | — | INSTANT |
| PC00009 | AREA 1 | 133.144.1.110 | 2006/08/01 15:11:24 | — | — | — | — | — | INSTANT |
| ... | ... | ... | ... | ... | ... | ... | ... | ... | |

NETWORK SYSTEM

INCORPORATION BY REFERENCE

The present application claims priority from Japanese application JP 2006-316463 filed on Nov. 24, 2006, the content of which is hereby incorporated by reference into this application.

BACKGROUND OF THE INVENTION

The present invention relates to a network system which includes a thin client.

In these years, much attention is focused on a system which includes a thin client (computer which has no storage device or which inhibits use of such a storage device). In the system, a server, which is connected through the network, collectively manages data and the thin client cannot hold such data (refer to JP-A-2006-209610).

SUMMARY OF THE INVENTION

When a computer inhibits the use of a storage device, it is necessary for an operator or the like to go to the location of the computer installation, transfer the data of the computer to the server, and set the computer to inhibit the user of the storage device therefore.

Since it is expected that such a system as to include the thin client spread will be spread, it is also expected that the number of computers having thin clients will be increased to an order of thousands of thousands and such many computers will be installed in all parts of Japan. In such a case, if operators or the like set such computers one by one, then the amount of cost and labor becomes enormous. However, such a problem is not considered in the aforementioned JP-A-2006-209610.

It is therefore an object of the present invention to provide a system which can eliminate the need for operators to go to the local sites of installed computers and can transfer data stored at the terminals to a server via a network, that is, can quickly change the terminals to thin clients.

The above problem can be solved by providing one of preferred aspects of the present invention, which follows.

In accordance with the aspect of the present invention, there is provided a network system having a management device, a server, and a terminal, which are connected through a network, wherein the management device includes a status managing unit for collecting status information on a status of the terminal from the terminal and a terminal instructing unit for transmitting a transfer start message to the terminal to instruct the terminal to transfer data to the server from the terminal on the basis of the status information collected by the status manager, the terminal includes a determining unit for determining whether or not to transfer the data when receiving the transfer start message, a data transferring unit for transferring the data to the server when the determining unit determines the data transfer, a storage device control unit for erasing the data from a storage device provided in the terminal when the data transferring unit completes the transfer of the data, and a thin client shifting unit for causing the terminal to function as a thin client after the data is erased from the storage device.

In accordance with the present invention, there can be provided a system which can eliminate the need for operators to go to the local sites of installed computers and can transfer data stored at the terminals to a server via a network, that is, can quickly change the terminals to thin clients.

BRIEF DESCRIPTION OF THE DRAWINGS

FIG. 5 shows a shift management table.

DESCRIPTION OF THE EMBODIMENTS

An embodiment of the present invention will be explained with reference to the attached drawings.

Figure 1:
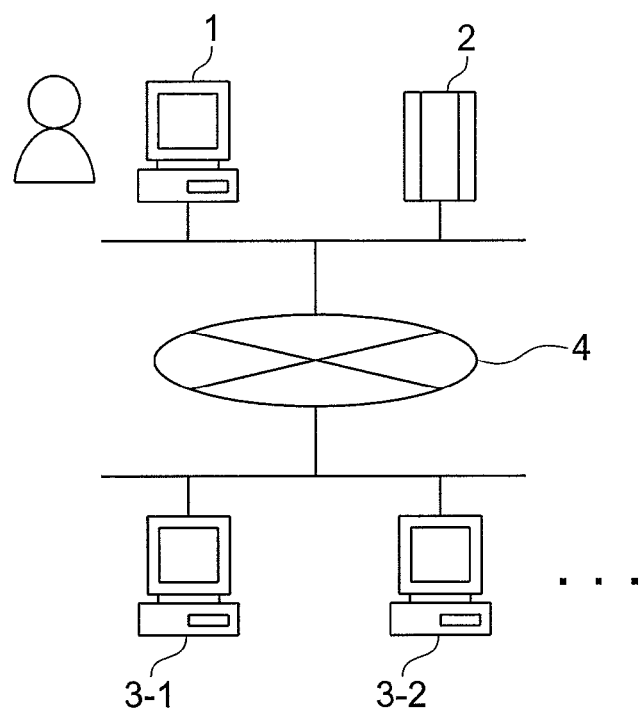
FIG. 1 shows network system.

FIG. 1 shows a network system.

The network system includes a management device 1, a server 2, and a plurality of terminals 3 (3-1, 3-2, . . . ), which are connected through a network 4.

The terminal 3 is classified into a thin client unit type and a non-thin client type (which can use a storage device). However, it is assumed that, only when the terminal 3 is of the thin client type, the terminal forms a thin client system together with the server 2. Further, the function of the management device 1 and the function of the server 2 may be implemented by the same computer.

Figure 2:
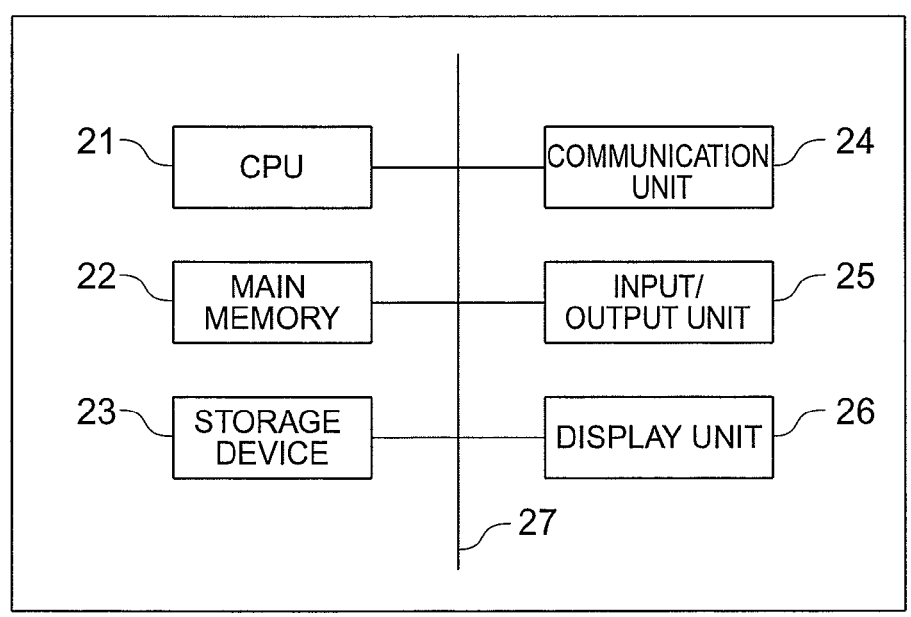
FIG. 2 is a hardware configuration of a computer.

FIG. 2 is a hardware configuration of a computer (such as the management device 1, the server 2, or the terminal 3).

The computer has a CPU 21, a main memory 22, a storage device 23, a communication unit 24, an input/output unit 25 (including a keyboard, a mouse, etc.), and a display unit 26, which are all interconnected by a communication line 27 such as a bus. When the computer is of the thin client type, the use of the storage device 23 is inhibited or the storage device is absent. The server 2 may not be equipped with the display unit 26.

The CPU 21 reads a program stored in the storage device 23 (or a program stored in the server 2 when the computer is of the thin client type) into the main memory 22, and executes various types of processing operations. The program and data to be explained in the present embodiment may be previously stored in the storage device 23, may be input from a storage medium such as a CD-ROM, or may be downloaded from another device via the network. The function to be implemented by the program may be implemented by exclusive hardware.

The program may be sometimes explained in the following description as if the program is an action entity. However, it goes without saying that the CPU is an actual action entity which executes the program for processing.

Figure 3:
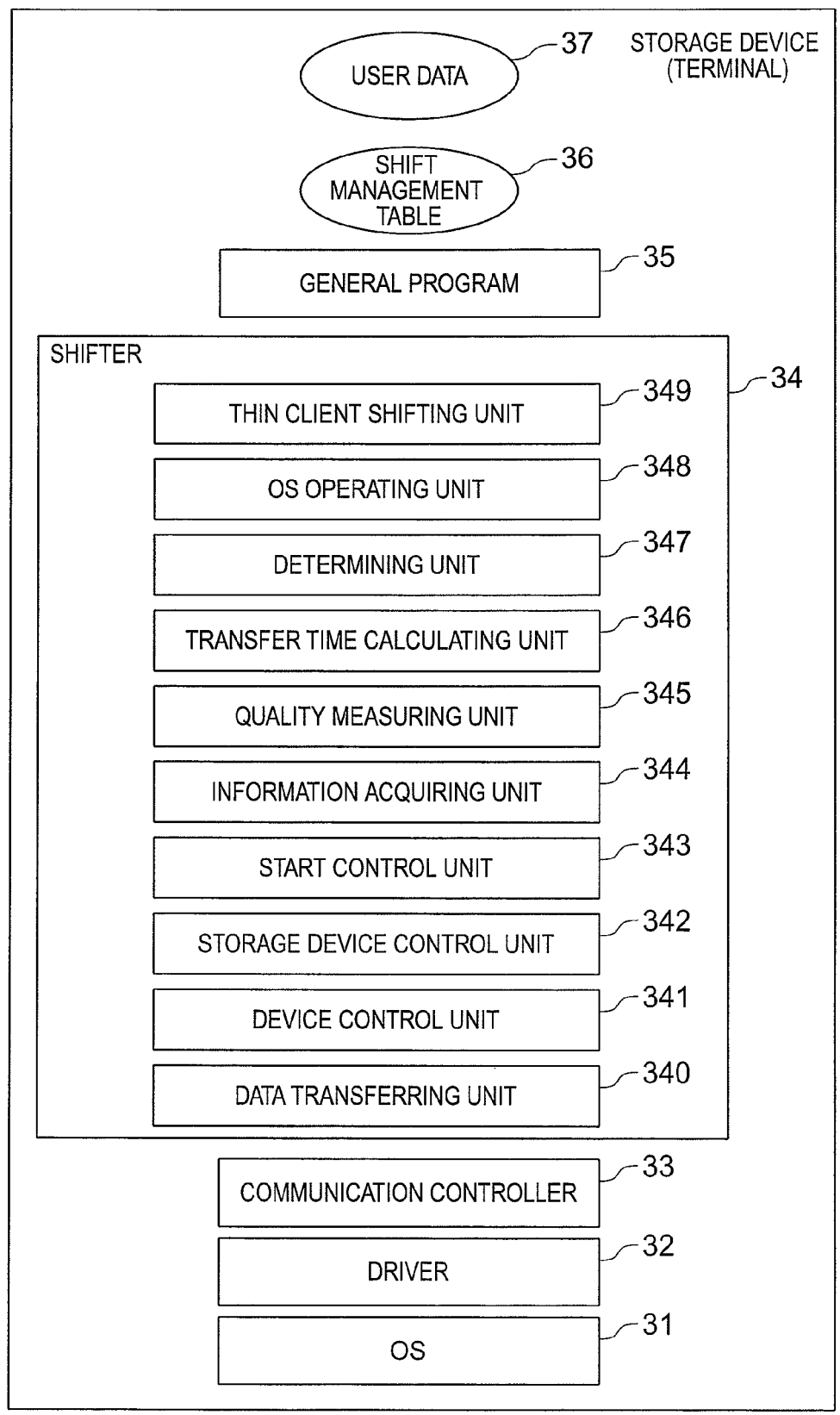
FIG. 3 a software configuration stored in a storage device of a terminal 3.

FIG. 3 is a software configuration stored in the storage device of the terminal 3.

The storage device of the terminal 3 stores therein an operating system (which will be referred to merely as the OS, hereinafter) 31, a driver 32 for controlling hardware, a communication controller 33 communicating with another device, a shifter 34 for changing the terminal 3 to a thin client while exchanging a message with the management device 1, a general program 35 such as Word or Spreadsheet software, a shift management table 36 to be explained later, and user data 37 such as a file.

The shifter 34 includes a data transferring unit 340 for transmitting (transferring) data to the server 2, a device control unit 341 for controlling a device connected to the terminal 3, a storage device control unit 342 for controlling an access of the terminal 3 to the storage device, a start control unit 343 for controlling the start of the general program 35 specified by an operator or the like from as a target, an information acquiring unit 344 for acquiring the transfer state (55 in FIG. 5) of the terminal of interest or inventory information, a quality measuring unit 345 for measuring the quality of the network 4, a transfer time calculating unit 346 for calculating a data transfer time, a determining unit 347 for performing various types of determinations including a determination of whether or not the data transfer can be possible, an OS operating unit 348 for controlling the OS or rewriting set information thereon, and a thin client shifting unit 349 for causing the terminal 3 to function as a thin client.

The word "inventory information" as used herein refers to information on hardware such as the CPU or memory, software information, set information, or management information on software stored in the terminal. The "quality" as used therein includes the presence or absence of data communication or connectivity, a communication transmission delay time, a use band, a throughput, a loss, and a fluctuation. An example of the quality measuring unit 345 is a command such as Ping or Traceroute. The command Ping is a program for diagnosing the presence or absence of communication between the devices connected through the IP network or for measuring a round trip communication time for the communication data. The command Traceroute is a program for inspecting a route including a router installed between devices connected through the network. Such a program uses a so-called active measuring technique for transmitting network measuring data to see the behavior of the data and to measure the quality of the network, or uses a so-called passive measuring technique for catching data flowing through a network to see the behavior of the data and to measure the quality of the network.

A device to be connected to the terminal 3 is a device which can be connected to an external input/output port such as a PCMCIA slot, such as a DVD drive, a CD drive, a RAM drive, a MO drive, or an FD drive.

The shifter 34 is previously installed in a terminal which is to be installed at a local site. With respect to a terminal already installed, it is required for the user of the terminal to install the shifter in the terminal. For example, it is considered that the terminal user installs the shifter from a mailed CD-ROM, or downloads the shifter and installs it.

Figure 4:
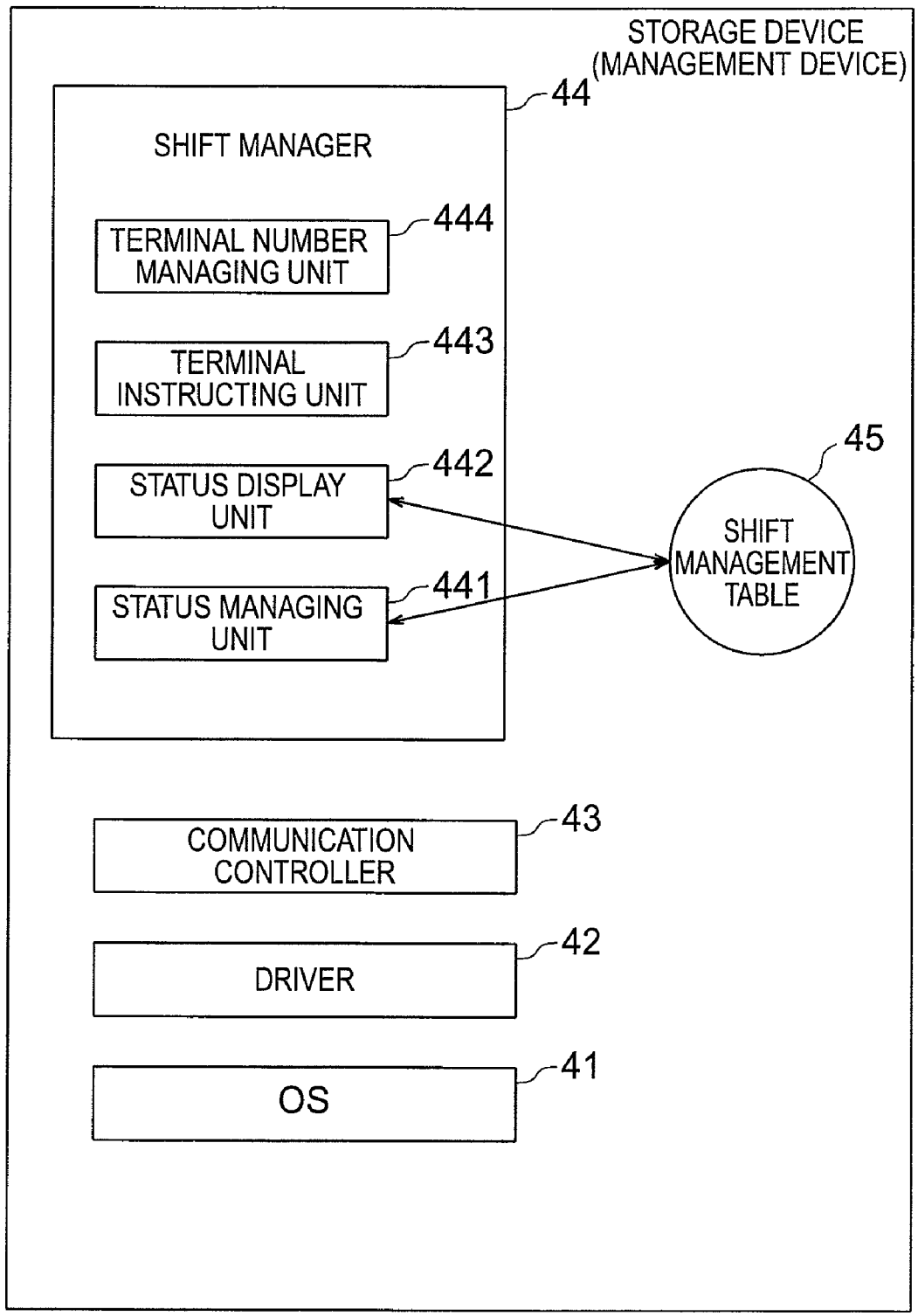
FIG. 4 is a software configuration stored in a storage device of a management device 1.

FIG. 4 is a software configuration stored in the storage device of the management device 1.

The storage device of the management device 1 includes programs of an OS 41, a driver 42, a communication controller 43, and a shift manager 44, and also includes a shift management table 45.

The shift manager 44 has a status managing unit 441 for recording the execution status of the shifter 34 transmitted from the terminal 3 in the shift management table 45, a status display unit 442 for displaying the contents of the shift management table 45 on the display unit of the management device 1, a terminal instructing unit 443 for issuing various types of instructions to the terminal 3 by the operator who instructs the terminal instructing unit with use of the input/output device, and a terminal number managing unit 444 for managing the number of terminals connected to the server 2 and an upper limit of terminals capable of being connected to the server 2.

FIG. 5 shows the shift management table 36 (or 45).

The table holds, as a set of pieces of data, an identifier 50 for uniquely identifying the terminal 3, an installation location 51 indicative of a location (e.g., corporation title, building name, or geographical position information expressed by latitude and longitude) where the terminal 3 is installed, own terminal logical identification information 52, an update date 53 indicative of a date at which the information was updated, a program running status 54 indicative of the status of the shifter 34 installed in the terminal 3, a shift status 55 indicative of the transfer state of the terminal 3 during shift from a non-thin client to a thin client, a shift destination logic identification information 56 indicative of an IP address or the like of the server 2 as the shift destination specified by the operator or the like, a transfer time 57 indicative of a time taken for the data transfer, an enabled/disabled shift-back 58 (which records 'enable' therein when the shift-back is enabled, and 'disable' when the shift-back is disabled) indicating whether or not the terminal 3 shifted to a thin client (or being shifted to a thin client) can be returned to a non-thin client, and a transfer start time (year, month, day, time; days or a time required after execution instruction) 59 indicative of a data transfer start time. In the shift management table 36 of the terminal 3, data addition and updating are carried out as necessary according to a change in the status of the terminal itself. In the shift management table 45 of the management device 1, data addition and updating are carried out as necessary according to information when the shift manager 44 receives from the terminal 3 via the network 4 or according to operator's operation. The transfer start time 59 may be specified by the operator or the like.

The program running status 54 includes states of "before installed" when the shifter 34 is not installed in the terminal 3, "being installed" when the shifter is being installed therein, "stopped" when the shifter is installed but not executed yet, "being executed" when the shifter is installed and executed, and "executed and completed" when the shifter is installed and its normal execution is completed. The shift status 55 includes states of "before shifted", "being shifted", "stopped", and "completed". The state "being shifted" further includes statuses of "during transfer time calculation" when the quality of the network is measured to calculate a data transfer time, "during data duplication" when data stored in the storage device of the terminal 3 is copying to the storage device of the server 2, "during data erasure" when the data stored in the storage device of the terminal 3 is being erased, and "during device invalidation" when the storage device or a device connected to the terminal 3 is being invalidated. The state "stopped" further includes statuses of "failure" when the data transfer is stopped due to some failure in the system, and "during shift-back" when the data transfer is being stopped in order for the terminal to be again returned to a non-thin client.

Figure 6:
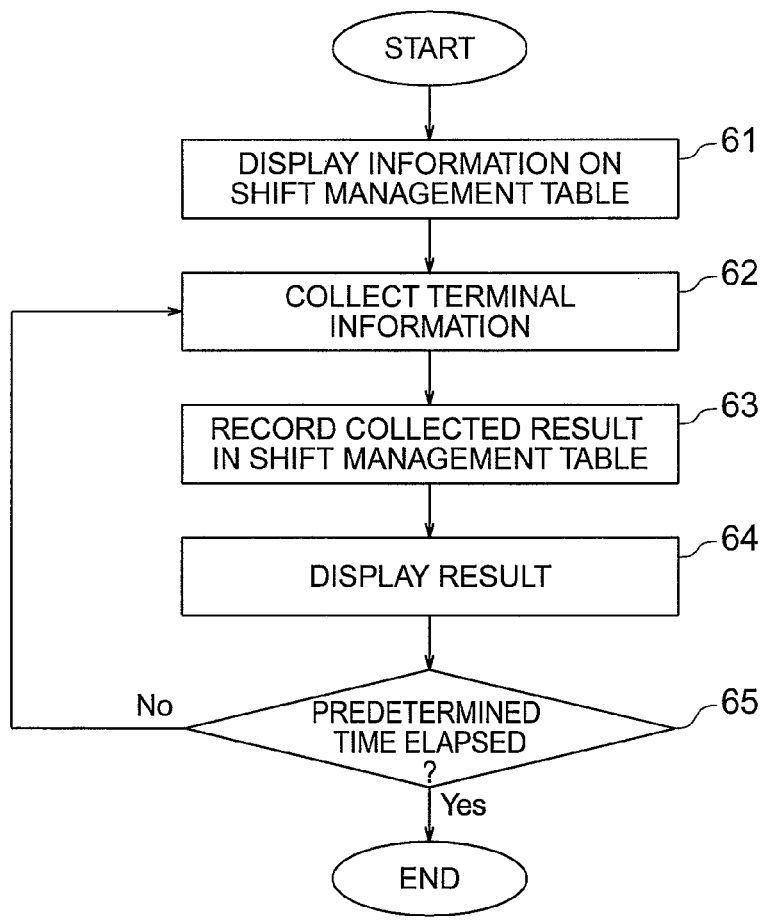
FIG. 6 is a flow chart of a status managing unit 44 of the management device 1.

FIG. 6 is a flow chart of the shift manager 44 in the management device 1.

The shift manager 44 first reads the shift management table 45 or a file in the main memory 22, and instructs the status display unit 442 to display the read information on the display unit (step 61).

The status managing unit 441 next collects information about the shift management table 36 of the terminal 3 (step 62) and records the collected information in the shift management table 45 (step 63). At this time, the shift manager also updates the update date 53. When the shift manager fails to collect information about the terminal 3 in the step 62, the shift manager determines that the terminal 3 has no shifter 34, and puts the program running status 54 of the shift management table 45 in "before installed".

The status display unit 442 next displays the updated shift management table 45 on the display unit of the management device 1 (step 64). Thereafter, after a fixed time elapses (step 65), the shift manager terminates its operation. Before the fixed time elapses, the shift manager returns to the step 62.

Figure 7:
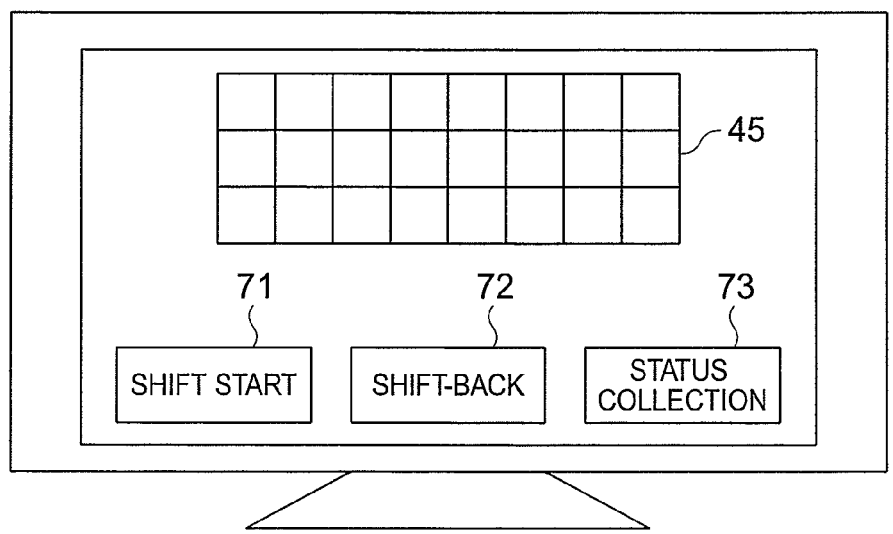
FIG. 7 is an example of a display screen of a display unit of the management device 1.

FIG. 7 shows an example of a display screen of the display unit of the management device 1.

The status display unit 442 sequentially displays information on the shift management table 45. When information is added, deleted or updated, the information on the display screen is also sequentially added, deleted or updated.

The operator or the like specifies a computer having the program running status 54 of the shift management table 45 of "being installed" or "being stopped" on the display screen, and clicks a "shift start" button 71 with a mouse.

When the "shift start" button 71 is clicked, the terminal instructing unit 443 transmits a shift start message (demanding execution start to cause the terminal 3 to be shifted from the non-thin client to the thin client) to the terminal 3. When the operator clicks a "shift-back" button 72 with the mouse, the terminal instructing unit 443 transmits a shift-back message (demanding execution start to cause the terminal 3 already shifted to the thin client or being shifted to the thin client to be returned to the non-thin client) to the terminal 3. When the number of terminals connected to the server 2 exceeds its upper limit value, the terminal number managing unit 444 holds the transmission of the shift start message. When the terminal number becomes smaller than the upper limit value, the terminal number managing unit 444 transmits the shift start message. Or a message saying "disabled shift" may be displayed on the display screen so that, when the shift became enabled, a message prompting the operator to start the shift may be displayed on the display screen.

When the operator clicks a "status collection" button 73, the terminal instructing unit transmits a status information request message (demanding information (status information) indicative of the execution state of the shifter 34 of the terminal 3) to the terminal 3. In this connection, when the status managing unit 441 is arranged to sequentially receive the status information from the terminal 3, the "status collection" button can be removed.

Figure 8:
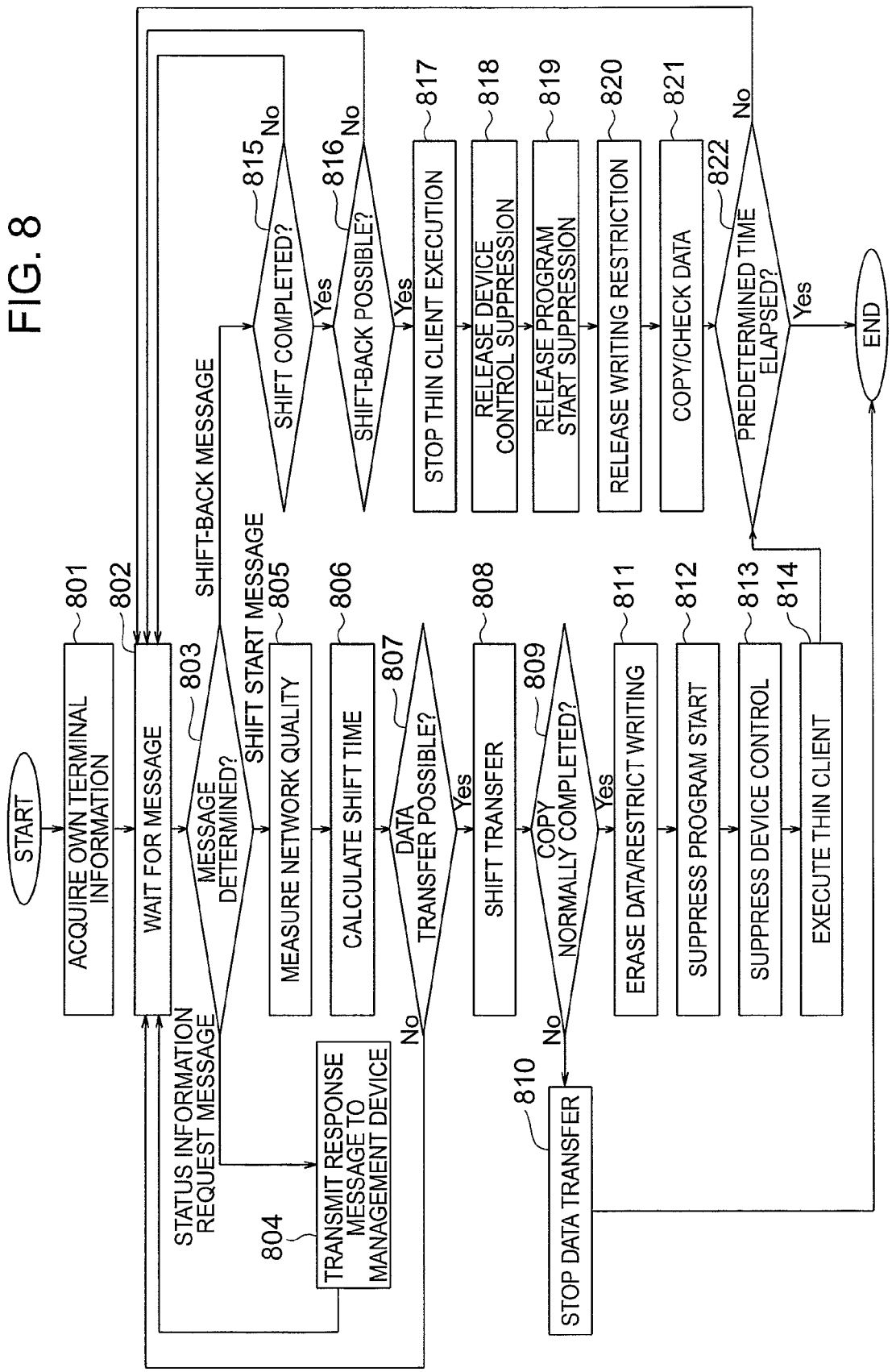
FIG. 8 is a flow chart of a shifter 34 of a terminal 3.

FIG. 8 is a flow chart showing the operation of the shifter 34 in the terminal 3.

The information acquiring unit 344 first acquires the shift status of its own terminal (corresponding to the shift status 55 in FIG. 5) and also inventory information thereabout (step 801). The shifter 34 then waits for a message from the management device 1 (step 802). When receiving the message, the shifter determines the type of the message (step 803). In this example, 3 types of messages, that is, the status information request message, the shift start message, and the shift-back message are treated.

When the shifter receives the status information request message, the communication controller 33 transmits the information acquired in the step 801 to the management device 1 as a response message (step 804). In this case, since the shift status of the terminal 3 is before the terminal is shifted to a thin client, the communication controller transmits information indicative of "before shifted" to the management device 1. Thereafter, the shifter returns to the step 802.

When the shifter receives the shift start message, the quality measuring unit 345 therein measures the quality of the network between the terminal 3 and the server 2 (step 805). At this time, information acquiring unit 344 transmits a response message indicative of "being shifted (being measured)" to the management device 1. The shift start message includes the IP address of the server 2 as the shift destination, information indicative of a location where data to be copied from the terminal 3 to the server 2 is stored, information indicative of a location where data in the server 2 is stored, a command program for copying data executable by the CPU of the terminal 3, an interpreter program, and a script program.

The shift time calculating unit 346 then calculates a shift time (shift time 57 in FIG. 5) required when the data stored in the terminal 3 is shifted to the server 2 on the basis of the amount of data stored in the terminal 3 acquired in the step 801 and the information about the network quality measured in the step 805 (step 806). And the determining unit 347 determines whether or not the data can be transferred (step 807).

One of methods for determining whether or not the data can be transferred is based on the calculated on the display screen time. In this method, for example, a threshold value is previously determined and the data is transferred when the transfer time does not exceed the threshold value. There is another method based on a time band. In this method, for example, data is transferred a predetermined time band such as a night time band when business is not transacted. When data transfer is not carried out according to the method based on the calculated transfer time, the steps 805 and 806 can be removed.

When the data transfer is determined, the data transferring unit 340 transfers the data (step 808). The data transferring unit 340 transfers the data to the server 2 where the CPU of the server 2 stores the received data in its own storage device. When no data transfer is determined, the shifter returns to the step 802.

The communication controller 33 transmits a message indicative of "being transferred (transfer time being calculated)" to the management device 1 when the transfer time is being calculated. After the transfer time is calculated, the communication controller transmits a response message indicative of "being shifted (data being copied)" when the data transfer is started, and transmits a response message indicative of "stopped (failure)" when no data transfer is carried out.

Next, the determining unit 347 confirms that the copied data coincides with the data of the copy originator and determines whether or not the copying was normally completed (step 809). When the shifter is interrupted during the copying operation or when a non-coincidence is found between the copied and original data, the shifter regards it as a failure in the shifting operation, and stops its shifting operation (step 810). The communication controller 33 transmits a response message indicative of "stopped (failure)" to the management device 1, and then terminates its operation.

When the data copying operation is normally completed, the storage device control unit 342 erases the data stored in the storage device of the terminal 3, and sets the terminal in a write restriction mode to suppress data writing to the storage device (step 811). The communication controller 33 transmits a response message indicative of "being transferred (data being erased)" to the management device 1.

The start control unit 343 next suppresses the start or activation of a program stored in the terminal 3 (step 812). The device control unit 341 suppresses the driving of a device connected to the terminal 3 (step 813).

Next, the thin client shifting unit 349 communicates with the server 2 to cause the terminal 3 to function as a thin client (step 814). More specifically, the use of an OA program or the like so far operated in the terminal 3 is invalidated, and only display screen information for the operation of the server 2 looks like being operated, or activated and displayed on the terminal 3. Thereafter, after a predetermined time elapses (step 822), the shifter terminates its operation. When the predetermined time does not elapse, the shifter returns to the step 802.

The communication controller 33 transmits a message indicative of "shift completed" to the management device 1. At this stage, the shift of the terminal 3 from the non-thin client to the thin client is completed. Thereafter, the shifter returns to the step 802.

When the shifter receives the shift-back message, the determining unit 347 determines the status of the terminal 3 (step 815). When the shift status 55 of the shift management table 36 is "shift completed", the shifter goes to a step 816. When the shift status is "being shifted" or "stopped", the shifter returns to the step 802 and stops its transiting operation. At this time, the determining unit 347 transmits a message indicative of "before shifted" to the management device 1.

The determining unit 347 next determines whether or not the terminal 3 can be returned to the status before the transiting operation is started (step 816). More specifically, the determining unit determines whether or not a time duration enabling the shift-back elapses. When shift-back is possible, the thin client shifting unit 349 stops its operation (step 817). When the shift-back is impossible, the shifter returns to the step 802.

The device control unit 341 then releases the control suppression of a device connected to the terminal 3 (step 818), and the start control unit 343 releases the suppression of the program activation (step 819), and the storage device control unit 342 releases the write restriction to the storage device (step 820).

Next, the shifter copies data from the server 2, checks the copied data (step 821), and returns the terminal to the non-thin client before shifted. At this time, the communication controller 33 transmits a message indicative of "before shifted" to the management device 1. Thereafter, when a predetermined time elapses (step 822), the shifter terminates its operation. When the predetermined time does not elapses, the shifter returns to the step 802.

Each time that a message is transmitted from the terminal 3, the management device 1 updates its own shift management table 45 and displays it on the display unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for shifting a terminal from a non-thin client state to a thin client state, within a network system including a management device, a sever and a plurality of terminals including the terminal, the method comprising:
   collecting, at the management device, information on status of each of the plurality of terminals;
   referring to the information collected, and designating, at the manager device, a terminal as a designated terminal which is to be made operable as a thin client terminal;
   transmitting, via a terminal instructing unit included within the management device, a shift start message toward the designated terminal, the shift start message for demanding the designated terminal to shift from the non-thin client state to the thin client state;
   judging, at the designated terminal, in response to receiving of the shift start message, whether or not data stored in the designated terminal can be transferred to a server;
   transferring, by a data transferring unit included within the designated terminal, the data stored in the designated terminal toward the server in response to the judging indicating that the data stored in the designated terminal can be transferred to a server;
   deleting, at the designated terminal, the data in the designated terminal after completion of the transferring; and
   causing, by a thin client shifting unit and the server, the designated terminal to function as a thin client.

2. The method according to claim 1, wherein the judging comprises:
   measuring a quality of a network between the designated terminal and the server; and
   calculating a time required for transferring data from the designated terminal to the server in accordance with both the measured quality of the network between the designated terminal and the server, and an amount of the data to be transferred from the designated terminal to the server;
   wherein the judging considers the calculated time in deciding whether or not data stored in the designated terminal can be transferred to the server.

3. The method according to claim 2, wherein a threshold time useable in the judging in deciding whether or not data stored in the designated terminal can be transferred to the server is determined in advance, and wherein the transferring is performed only when the calculated time for the data to be transferred, is smaller than an amount of the threshold time.

4. The method according to claim 1, wherein the management device stores a maximum number of terminals permitted to be connected to the server, and is configured not to transmit the shift start message when a number of terminals connected to the server exceeds the maximum number of terminals.

5. The method according to claim 1, wherein the shift start message includes a data transfer start time at which the transferring is to start.

6. The method according to claim 1, wherein the management device is configured to transmit a shift-back message in response to a predetermined operation, and wherein the designated terminal is further configured to judge whether or not a predetermined period of time elapses after receiving of the shift-back message, and to stop the transferring when the predetermined period of tine has not elapsed.

7. The method according to claim 1, wherein each of the plurality of terminals has been respectively assigned an identifier, and the management device is arranged to store information in a table manner, on each of the plurality of terminals and status of the transferring for the plurality of terminals by using the identifier.

8. The method according to claim 7, wherein the management device is further configured to have a display screen on which relationships between the identifier and the status for each of the plurality of terminals are displayed in the table manner.

* * * * *